UNITED STATES PATENT OFFICE.

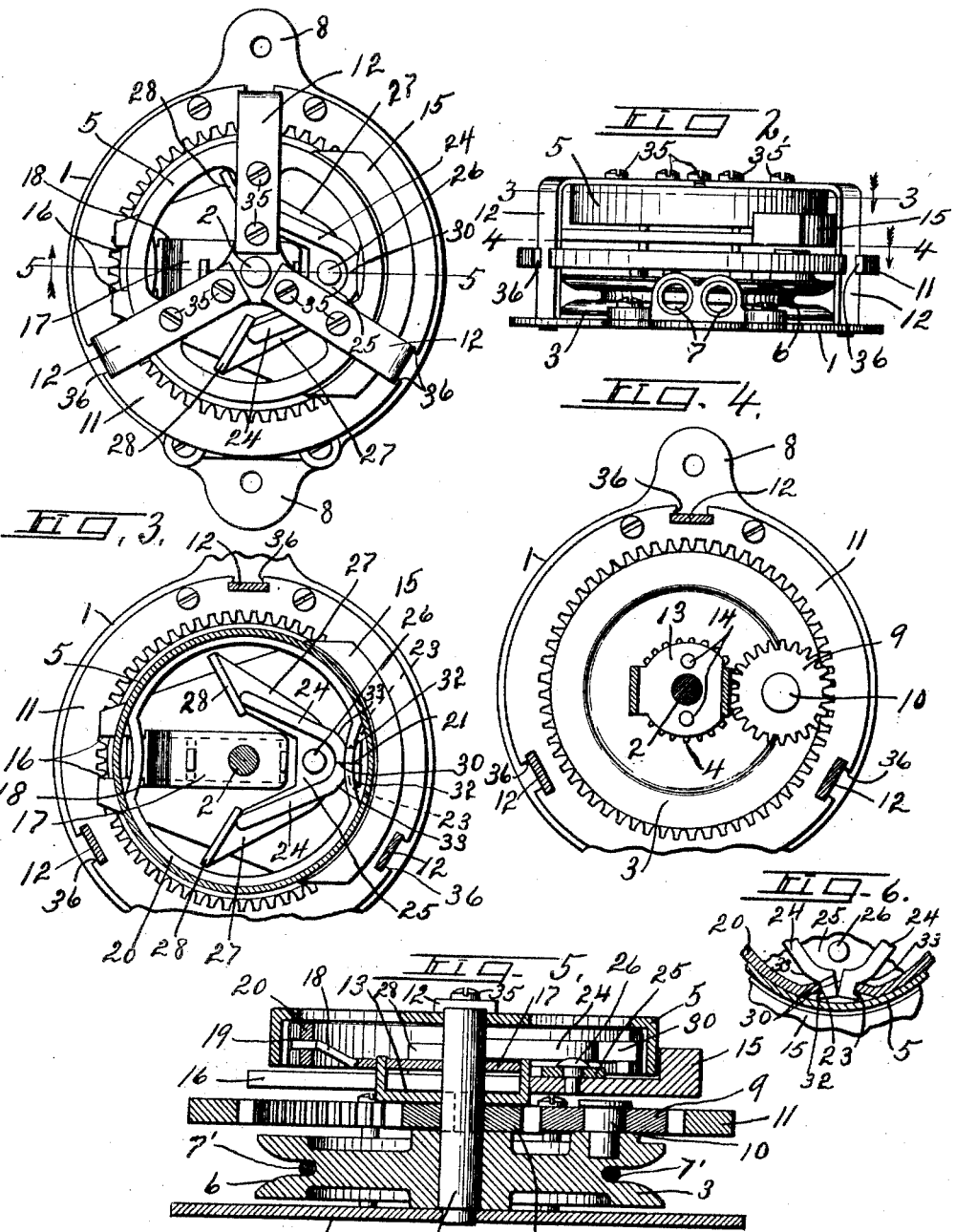

CHARLES F. DAVY, OF SYRACUSE, NEW YORK.

FIRE-ESCAPE.

1,116,680. Specification of Letters Patent. Patented Nov. 10, 1914.

Application filed May 6, 1913. Serial No. 765,790.

*To all whom it may concern:*

Be it known that I, CHARLES F. DAVY, of Syracuse, in the county of Onondaga, in the State of New York, have invented new and useful Improvements in Fire-Escapes, of which the following, taken in connection with the accompanying drawings, is a full, clear, and exact description.

This invention relates to certain improvements in fire escapes of the class set forth in my Patent No. 827,510 issued July 31, 1906, in which a brake shoe is operated against a suitable brake band by the centrifugal action of a weighted member and suitable connections for the brake shoe, such centrifugal action being produced by the rotation of a sheave around which a cable carrying one or more passengers is adapted to pass.

The main object is to increase the general efficiency of this class of apparatus by reducing the number of working parts to a minimum and assembling such parts so as to apply a maximum but uniform leverage upon both ends of the brake shoe simultaneously. In other words, I have sought to equalize the force or pressure by which the ends of the brake shoe are expanded into contact with the brake drum by the centrifugal action of the weighted member.

Another object is to avoid as far as possible the use of pivots or toggles in the connections between the centrifugally operated weight and brake shoe and, at the same time, to employ separate coacting levers fulcrumed one against the other and acting upon the adjacent ends of the brake through the medium of separate cams on the centrifugally operated weight so as to expand the ring against the inner face of the brake drum under pressure in direct ratio with the varying speeds of revolution of the weighted member.

A further object is to enable the relatively stationary gear to be held operative against rotation by the same frame bars which connect the brake drum to the base plate.

A still further object is to enable the entire mechanism to be brought into a even more compact space than has heretofore been practised.

Other objects and uses will be brought out in the following description.

In the drawings—Figure 1 is a front face view of a fire escape embodying the various features of my invention. Fig. 2 is an inverted plan of the same device. Figs. 3, 4 and 5 are detail sectional views taken respectively on lines 3—3 and 4—4, Fig. 2, and 5—5, Fig. 1. Fig. 6 is a detail sectional view of the meeting ends of the brake ring and adjacent ends of the spreading levers shown in position for expanding the ring into engagement with the brake drum.

This device comprises a back plate —1— having a stud —2— secured at one end and projecting forwardly at right angles therefrom for receiving a groove pulley —3—, a pinion —4— and a brake drum —5—. The pulley —3— is loosely journaled upon the rear end of the shaft or stud —2— close to the back plate —1— and is provided with an annular groove —6— for receiving an operating cable —7'—, the latter being passed around the upper side of the pulley and adapted to wedge tightly into the groove to prevent slipping. The ends of the cable are brought through suitable eyes —7— on the bottom of the back plate —1— and in close proximity to each other with their axis in substantial alinement with the groove —6—, thereby causing the cable to embrace the greater portion of the periphery of the pulley to assure a tight fitting grip therein without liability of slipping. The ends of the cable are provided with suitable surface loops for attachment to the body of a passenger so that, when one end of the cable is descending with an occupant in one of the loops, the other loop is being elevated to the floor or story at which the fire escape is secured, the upper loop being then in position for use by another occupant after the occupant of the descending loop has been rescued. The back piece is adapted to be securely fastened to the interior of the window casing or other suitable support and for this purpose is provided with apertured ears —8— for receiving screws, bolts or other fastening means.

A pinion —9— is journaled upon a suitable stud —10— on the pulley —3— some distance to one side of the shaft or stud —2— and is adapted to mesh with a relatively large stationary gear —11— and also with a pinion —4—, said pinion —4— being also loose on the shaft or stud —2— so that, as the pulley —3— is rotated in either direction by the cable —7', the pinion —9— will be carried bodily with it and thereby transmit motion to the pinion —4— in the same direction as that of the pulley. The gears —4—, —9— and —11— are disposed in the same plane just at the front side of the pulley —3—, the gear —11— being held against rotation by suitable bars —12— which together with the back plate —1— constitute a part of the main supporting frame for the movable elements.

A U-shape plate —13— is secured by suitable fastening means, as rivets, —14— to the front face of the pinion —4— and constitutes a guide for a radially movable centrifugally operated weighted member —15— which is provided with a central lengthwise slot —16— through which the arms of the plate —13— project as shown more clearly in Fig. 5. These forwardly projecting arms are somewhat narrower than the base of the plate —13— and correspond in width to the width of the slot —16— so as to allow the opposite arms of the weighted member to slide freely along and against the opposite edges of the arms and at the same time permitting the back of the weighted member —15— to rest upon the base of the plate —13—. This plate is also revolubly mounted upon the shaft or stud —2— so that the forwardly projecting arms on the opposite ends thereof extend through the slot —16— and engage the opposite arms of the weighted member —15— at opposite sides of the stud, thereby locking said weighted member to the pinion —4— to rotate therewith at a relatively high speed as compared with the speed of rotation of the pulley —3— by reason of the fact that the pinions —4— and —9— are of considerably less radius than that of the gear —11— with which the pinion —9— meshes.

Rigidly secured to the front ends of the forwardly projecting arms of the plate —13— is a locking plate —17— which not only serves to retain the weighted member —15— in operative position against forward axial movement but is also provided with a radially projecting extension —18— engaged in a recess or aperture —19— in one side of a brake ring —20—. This brake ring is divided at —21— through its diametrically opposite side and its meeting ends are formed with recesses —23— for receiving the adjacent ends of a pair of spreading levers —24— as shown more clearly in Figs. 1, 3 and 5. The brake ring —20—, being locked by the extension —18— of the plate —17— to the opposite plate —13—, is, therefore, caused to rotate with and at the same rate of speed as the pinion —4— and weighted member —15— and is of substantially the same diameter as the interior diameter of the brake drum —5— within which it fits and is adapted to coact, the brake ring being spring-tensioned to normally free itself from frictional engagement with the brake drum when at rest or rotating under comparatively slow speed.

A cam plate —25— is pivoted at —26— to the weighted member —15— at the same side of the plate —13— as the division in the brake ring but is provided with inwardly diverging arms —27— extending across the opposite sides of the plate —13— and are, therefore, disposed at opposite sides of the shaft or stud —2—, the free ends of said arms —27— being provided with forwardly projecting flanges —28— which are disposed in planes at an angle with each other or converging toward the pivot —26— to form inclined bearing faces for the adjacent ends of the levers —24—. These levers —24— also diverge inwardly from their points of connection with the meeting ends of the split ring —20— and extend across the front faces of the arms —27— so as to terminate against the adjacent faces of the cam flanges —28—. The ends of the levers —24— which converge toward and are interlocked with the meeting ends of the brake ring are provided with substantially straight or flat meeting faces —30— normally abutting against each other and substantially coincident with the meeting faces of the brake ring.

The meeting ends of the brake ring and also the diametrically opposite side thereof are depressed or deflected inwardly so as to form intervening openings between these portions of the brake ring and inner surfaces of the brake drum to receive the outwardly projecting ends or tangs of the levers —24— and also of the extension —18— without contacting with the inner surface of the brake drum, the object being to permit the outer ends of the levers —24— and extension —18— to be more effectively locked to the brake ring.

The outer ends of the levers —24— are fitted closely in their recesses —23— with an easy sliding fit and are provided with laterally projecting shoulders —32— and —33— engaging respectively the outer and inner faces of the adjacent portions of the brake ring with sufficient clearance to permit the levers —24— to be deflected slightly from their normal positions under the action of the cams —28— thereon as produced by the centrifugal movement of the weighted member —15— to which the cam plate is pivoted. The object in pivoting this cam plate to the weighted member is to permit the cams —28— to automatically adjust themselves to the ends of the levers —24— so as to operate both levers simultaneously with equal pressure or force.

As previously stated the flat meeting faces —30— of the levers —24— abut against each other from end to end and the extreme outer ends of said meeting faces constitute fulcrums about which both levers may be turned and, in view of the fact that the portions of the levers which extend through the slots —23— are in normal engagement with the ends of the slots, it follows that, as the levers are expanded or spread apart by the outward centrifugal movement of the weighted member —15—, the meeting ends of the brake ring will be similarly spread, thereby expanding the ring uniformly into braking engagement with the brake drum. The length of the levers is somewhat greater than the radius of the brake ring owing to their divergent angle one with the other and the fact that their inner ends terminate at diametrically opposite sides of the shaft or stud —2— and by bringing the outer ends of the levers into flat contact with each other to establish a fulcrum at their extreme outer ends, it is evident that practically the full length of the lever is utilized in expanding the brake against the brake drum under the centrifugal action of the weighted member —15— during the rotation of the pulley —3— by means of the brake being equally effective in either direction of rotation of the pulley.

The brake drum —5— is held stationary against rotation by means of the arms —12—, the front ends of which are disposed radially and horizontally equi-distant apart across the front face of the brake drum —5— and are secured thereto by suitable fastening means, as screws —35—. The outer ends of these arms are disposed at substantially right angles to their front radial portions parallel with the axis of the shaft or stud —2— and their free ends are passed through apertures in the back plate —1— and firmly riveted thereto so that the back plate and arms constitute a rigid frame for supporting the drum and other parts of the device. The axially extending portions of the arms —12— are passed through slots or recesses —36— in the periphery of the gear —11— for firmly holding the latter in operative position against rotary movement.

What I claim is:

1. In a fire escape, the combination with a frame, a pulley mounted therein and designed to have a cable associated therewith, of means for controlling the movement of the pulley including, a brake drum, a split brake ring, means between the pulley and ring for rotating the ring from the pulley and for retarding the movement of the pulley when the rotation of the ring is retarded, a centrifugally operated member, and means actuated by said member for expanding the ring against the brake drum, said means comprising duplicate members designed to fulcrum upon each other and having corresponding ends operating between the ends of the split ring and having their opposite ends located on opposite sides of a plane intersecting the axis of the pulley and the ends of the split ring, and a part carried by the centrifugally operated member for coöperating with the last-named ends for forcing the same apart, as said part is thrown outwardly by centrifugal force, substantially as and for the purpose described.

2. In a fire escape, the combinations with a frame, a pulley mounted therein and designed to have a cable associated therewith, of means for controlling the movement of the pulley including, a brake drum, a split brake ring, means between the pulley and ring for rotating the ring from the pulley and for retarding the movement of the pulley when the rotation of the ring is retarded, a centrifugally operated member, and means actuated by said member for expanding the ring against the brake drum, said means including duplicate members designed to fulcrum on each other and having corresponding ends operating between the ends of the ring, and their opposite ends diverging from each other, and shoulders coöperating with the last-named ends, said shoulders being movable with the centrifugal member, and having their operating surfaces disposed at obtuse angles to the direction of movement under centrifugal force of said member, substantially as and for the purpose specified.

3. In a fire escape, the combination with a frame, a pulley mounted therein and designed to have a cable associated therewith, of means for controlling the movement of the pulley including, a brake drum, a split brake ring, means between the pulley and ring for rotating the ring from the pulley and for retarding the movement of the pulley when the rotation of the ring is retarded, a centrifugally operated member, and means actuated by said member for expanding the ring against the brake drum, said means including duplicate members designed to fulcrum on each other and having corresponding ends operating between the ends of the split ring, the opposite ends of said members diverging from each other, and a part pivotally mounted on the centrifugally operated member, said part having its ends provided with shoulders for engagement with the diverging end portions of the duplicate members, said shoulders being arranged at an obtuse angle to the direction of movement of the centrifugally operated member when thrown outwardly by centrifugal force, substantially as and for the purpose set forth.

In witness whereof I have hereunto set my hand this 24th day of April 1913.

CHARLES F. DAVY.

Witnesses:
H. E. CHASE,
EVA E. GREENLEAF.